United States Patent Office 3,148,059
Patented Sept. 8, 1964

3,148,059
HOT MELT COMPOSITION FOR THREE-DIMENSIONAL PRINTING
Marion O. Brunson and James E. Huffaker, Kingsport, Tenn., assignors to Eastman Kodak Company, Rochester, N.Y., a corporation of New Jersey
No Drawing. Filed Dec. 16, 1960, Ser. No. 76,147
4 Claims. (Cl. 96—27)

This invention concerns a composition of hot melt plastic materials, more particularly coatings which may be embossed with a lenticular pattern for three dimensional pictures.

Hot melt applications of various plastic materials have been found suitable for a wide number of applications. The plastic material is applied in the molten state to various substrates, such as paper or the like, without requiring solvent recovery systems which are necessary for commonly used lacquer coatings.

Many of the hot melt coatings have been waxes or blends of waxes with other plastic materials. For instance, polyethylene has been combined with paraffin to provide a hot melt coating and cellulose esters have been applied satisfactorily using the hot melt method.

In order to provide a satisfactory coating for paper particularly paper webs carrying colored pictures, printing or the like on the surface, it is desirable to have a coating which will have good resistance to blocking, be resistant to abrasion, withstand folding, have good adhesion, and be resistant to solvents, stains, grease, and the like. However, the prior art compositions while satisfactory in many respects have not been found suitable in all of the above desirable respects, particularly when a lenticular pattern such as that shown in U.S. Patent No. 2,297,846 has been embossed on the hot melt coating. In view of the fine curvature of the lenticular pattern, very slight abrasions of a relatively soft coating can result in destroying the effect of the pattern and render it unsuitable. For this reason, it has been desired to find a plastic coating which would be able to hold the embossed pattern and at the same time have the above desirable characteristics.

After extended investigation we have discovered a polyolefin-hydrocorbon reisn blend which has remarkably good coating characteristics when applied by the hot melt process and which can be embossed with a lenticular pattern to provide a satisfactory three-dimensional effect.

One object of this invention is to provide a polyolefin-hydrocarbon resin blend for hot melt application. Another object is to provide a coating which withstands folding, has good adhesion to paper and printing inks, has good resistance to blocking and has good abrasion resistance. Another object is to provide an embossed hot melt coating which gives a three-dimensional effect and which retains the embossed pattern. Still another object is to provide new products comprised of a colored picture, printing and the like in combination with our new coating. Other objects will appear hereinafter.

In the broader aspects of our invention the above objects are obtained by combing a low molecular weight polyethylene, a thermally created polymer derived from polyethylene and polypropylene, a synthetic hydrocarbon resin, and a slip agent.

The low molecular weight polyethylene may be produced by the polymerization of ethylene. It may have a molecular weight of 4,000–12,000, a density of 0.8900–0.9720, and a melt viscosity at 150° of less than 40,000 cp.

In our preferred embodiment the polyethylene has a molecular weight of 7,000, a density of 0.907, a ring and ball softening point, 100–208° C., and a melt viscosity at 150° C. of 8,000–9,000 cp.

The thermally created polymer may be obtained by blending polypropylene having an inherent viscosity of 1.92 and a conditioned density of 0.91 on hot rolls with a low molecular weight polyethylene having the same physical characteristics as the polyethylene described above. The temperature of the rolls is 60 to 260° C. After the two polymers have been reacted together, the resulting composition is granulated and then extruded at a temperature of 260–400° C.

The hydrocarbon resin (polyterpene) may have a softening point of 40–150° C., specific gravity 25/25° C. of .970–.980, an acid number of less than one, and a molecular weight of 300–2,000. The resin is composed essentially of β-pinene.

Hydrocarbon resins produced by polymerization of unsaturates derived from the deep cracking of petroleum may also be used. These materials may have the following characteristics: softening point 50–150° C., specific gravity 25/25° C. of .970–.980, acid number less than one, iodine value (Wijs) of 80–150, and a molecular weight of 500–2,000.

We also prefer to include a slip agent, as oleyl amide, or acetylated monoglycerides marketed as Myvacet." The amides of C–10 through C–30 saturated and unsaturated mono- and polycarboxylic acids may be substituted for oleyl amide. Other amides which may be used are described in U.S. Patent No. 2,770,609.

The following composition illustrates certain useful ratios.

| Materials: | Parts by weight |
|---|---|
| Low molecular weight polyethylene | 84 |
| Polypropylene-low molecular weight polyethylene copolymer | 10 |
| Hydrocarbon resin | 5 |
| Acylamide | 1 |

The following indicate the range of proportions which are operative in the broader aspects of our invention.

| Materials: | Parts by weight |
|---|---|
| Low molecular weight polyethylene | 95–0 |
| Polyproylene-low molecular weight polyethylene copolymer | 0–95 |
| Hydrocarbon resin | 3–30 |
| Acylamide | 0.1–2.0 |

The following examples illustrate certain embodiments of our invention but are not intended to unduly limit the invention.

*Example I*

A coating composition having a blend of 84% low molecular weight polyethylene (7,000), 10% by weight of a co-degraded polymer of a mixture of 85% polypropylene and 15% polyethylene (7,000), 5% hydrocarbon resin having a melting point of 135° C., and 1.0% of oleyl amide was prepared. This blend was heated to a molten state and coated on a paper surface to a thickness of 10 mils and permitted to cool. It was tested for physical characteristics and found to be flexible enough to withstand folding, have good adhesion, good resistance to blocking. It was resistant to abrasion, colorless, and had good heat stability.

This blend was also embossed with a lenticulated pattern upon a specially prepared printed picture and the resulting coated picture had a good three dimensional effect. The uncoated picture was prepared by taking a photograph using a camera especially designed for movement around the subject matter. The photograph was then used to make printing plates, from which printed reproductions were made. The printed picture when coated and embossed with the above plastic blend had a good three dimensional effect. The coating and embossing may be in accordance with the process and apparatus of our companion co-pending application Serial No. 75,400, filed December 12, 1960, now U.S. Patent No. 3,110,608.

Accordingly, the invention includes in a method of preparing a lenticulated picture comprising making negatives from film exposures made through a lenticular screen in a moving camera focused on the subject matter from which the picture is to be made, making printing plates from the negatives, printing reproductions therefrom, the characterizing steps which comprise coating the pictures with a coating composition in molten condition essentially comprised of polyolefin, hydrocarbon resin, and a slip agent, then lenticulating the coated surface while still in a warm plastic condition.

*Example II*

A blend the same as that in Example I was coated over a colored photographic picture taken using a Printing-in-Dimension camera as just referred to. The coating was 10 mils in thickness. Following the coating, a refrigerated embossing cylinder was used to impress on the surface of the coating a lenticular pattern. The resulting picture was found to have a three-dimensional effect.

In the coating operation involving the embossing step, the melt was found to have sufficient adhesion to the paper stock to adhere to the paper and at the same time the melt would not stick to the embossing roll.

Cellulose acetate butyrate melts which can be used with excellent results in many melt coating operations when substituted for the blend disclosed above tended to adhere to the embossing roll and, therefore, was not as satisfactory as the new composition of the present invention.

A combination of the low molecular weight polyethylene (about 7,000) with a hydrocarbon resin was also found to be useable, but the resulting coating was not as satisfactory as the present example due to excessive softness.

*Example III*

A coating blend containing our preferred embodiment described above of polymer, copolymer, resin and slip agent was used in the Printing-in-Dimension operation described in Example II. The resulting pictures were excellent three-dimensional products and the coatings withstood testing for flexibility, resistance to abrasion, resistance to blocking, and had good adhesion. The brilliance of the colors were enhanced as may be noted on visual inspection.

*Example IV*

A coating composition as used in Example III was prepared without the hydrocarbon resin component. It was found to have poor adhesion to the substrate and also tended to pull off during the embossing step.

*Example V*

A coating composition the same as that in Example III was used with the omission of the thermally created polymer derived from polyethylene and polypropylene. The resulting coating was softer, had poorer abrasion resistance, and had a waxy feel. The soft nature of the coating permitted the lenticular pattern to be disturbed, impairing the three-dimensional effect on those areas where it had been removed. While such composition is not equivalent in quality to our preferred composition, for certain temporary or low cost uses such compositions have utility.

*Example VI*

A coating composition the same as that used in Example III was prepared but the acylamide was omitted. The coating tended to stick to the embossing roll and also had a sticky feel.

The thermally created polymer derived from polyethylene and polypropylene may be prepared according to the process described in U.S. patent application Serial No. 26,408, filed May 3, 1960, in the names of Coover et al.

In brief, the thermally created polymer derived from polyethylene and polypropylene may be obtained by a thermotreatment of a physical mixture of the two either in an inert solvent such as benzene or in a melt mixture, at a temperature from 250–450° C. and preferably in the absence of oxygen. The heat causes a degradation and also copolymerization and is preferably carried out in a vacuum or under nitrogen atmosphere. The thermotreatment may be carried out batch-wise or continuously. The final blend is made by dry blending the components in their preferred ratios and extruding.

Although our preferred coating thickness for use in the three-dimensional lenticular embossing process is of the order of 10 mils, other thicknesses from, for example, 2–20 mils may be applied using our hot melt process particularly as an overcoating for paper substrates for protection purposes and for enhancing the appearance of a printed or illustrated page. The physical characteristics of adhesion, flexibility, abrasion resistance, and the like, make these coatings especially suitable for many uses previously made using cellulose ester hot melt coatings or the like. That is, the new blend of the present invention may be used to produce smooth, glossy, protective coatings on papers by replacing the lenticulated embossing roll with a lightly polished roll. The resulting coating has good gloss, hardness, flexibility, scuff resistance and moisture vapor resistance.

The invention has been described in detail with particular reference to preferred embodiments thereof, but it will be understood that variations and modifications can be effected within the spirit and scope of the invention as described hereinabove and as defined in the appended claims.

We claim:

1. A lenticulated color picture comprising a paper base having a picture thereon, the picture being overcoated with a coating composition comprising a blend of 10–90% by weight polyethylene, 90–10% by weight of a thermally-created polymer derived from polyethylene and polypropylene, 3–30% by weight of a synthetic terpene resin, and 0.1 to 2.0% by weight of an amide of an organic acid selected from the class consisting of unsaturated mono-carboxylic acids and poly-carboxylic acids having from 10–30 carbon atoms said coating having a thickness of the order of 10 mils and being lenticulated.

2. In the method of preparing a lenticulated picture which includes making negatives from film exposures made through a lenticular screen in a moving camera focused on the subject matter from which the picture is to be made, making printing plates from the negatives, and printing reproductions therefrom, the characterizing steps which comprise coating the pictures with a coating composition in molten condition, essentially comprised of 10–90% by weight low molecular weight polyethylene, 90–10% by weight of a thermally-created polymer derived from polyethylene and polypropylene, 3–30% by weight of a synthetic terpene resin and a slip agent, and then lenticulating the coated surface while it is still in a warm plastic condition.

3. The process in accordance with claim 2 wherein the lenticulations on the coatings are correlated in size and shape with reference to the lenticules of said lenticular screen.

4. The process in accordance with claim 2 wherein the coating composition has a melt viscosity of less than 40,000 cp.

References Cited in the file of this patent

UNITED STATES PATENTS

| | | | |
|---|---|---|---|
| 2,086,182 | Dvornik | July 6, | 1937 |
| 2,140,702 | Kanolt | Dec. 20, | 1938 |
| 2,297,846 | Benschoten | Oct. 6, | 1942 |
| 2,361,347 | Brown | Oct. 24, | 1944 |
| 2,727,024 | Fields et al. | Dec. 13, | 1955 |
| 2,770,609 | Symonds | Nov. 13, | 1956 |
| 2,914,407 | Meyer | Nov. 24, | 1959 |
| 2,918,731 | Warhaftig et al. | Dec. 29, | 1959 |

FOREIGN PATENTS

| | | | |
|---|---|---|---|
| 151,101 | Australia | Apr. 27, | 1953 |
| 205,718 | Australia | Dec. 3, | 1956 |
| 215,125 | Australit | May 19, | 1958 |

UNITED STATES PATENT OFFICE
CERTIFICATE OF CORRECTION

Patent No. 3,148,059                      September 8, 1964

Marion O. Brunson et al.

It is hereby certified that error appears in the above numbered patent requiring correction and that the said Letters Patent should read as corrected below.

Column 2, line 6, for "100-208° C." read -- 100-102° C. --

Signed and sealed this 6th day of April 1965.

(SEAL)
Attest:

ERNEST W. SWIDER                      EDWARD J. BRENNER
Attesting Officer                       Commissioner of Patents